April 3, 1956   L. PETERSEN   2,740,620
ROTARY KILN WITH INTEGRAL PREHEATING OR COOLING MEANS
Filed Sept. 22, 1954   4 Sheets-Sheet 3
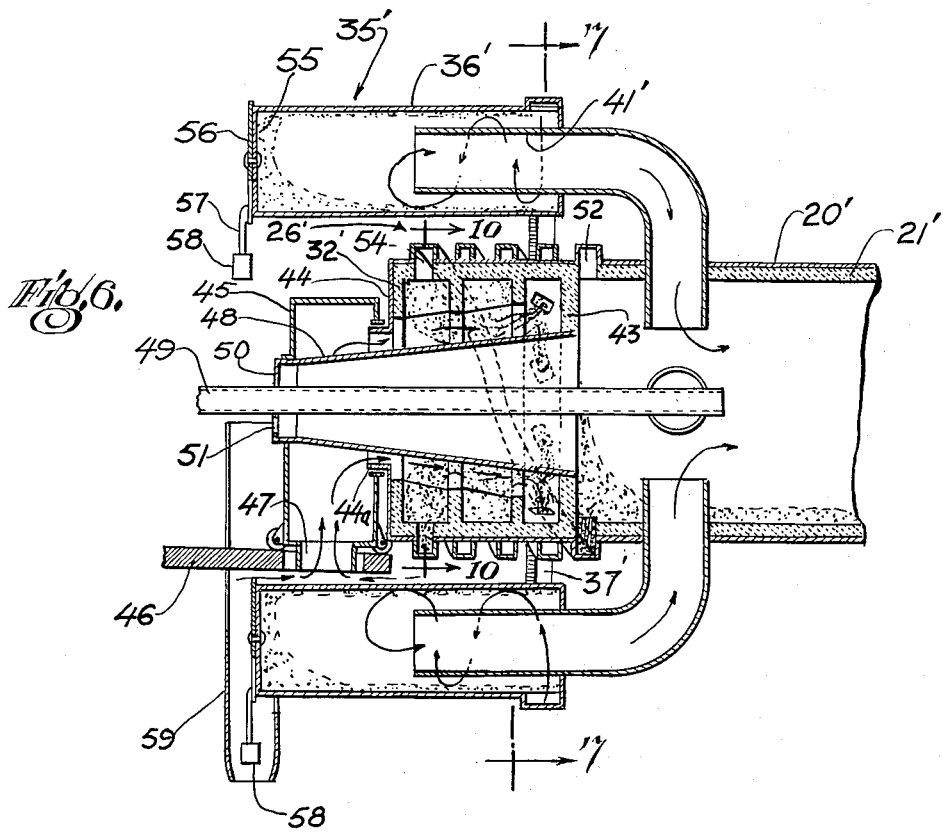
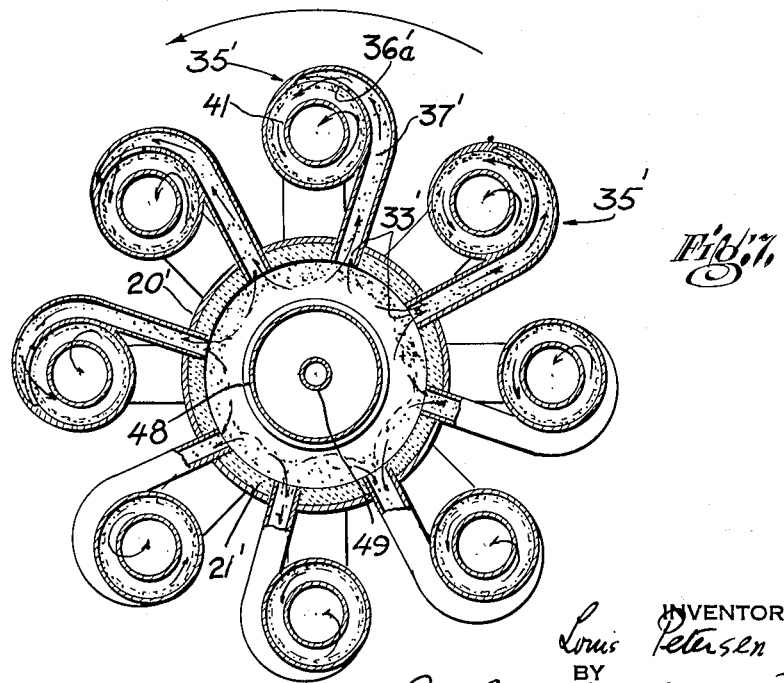
INVENTOR
Louis Petersen
BY
Pennie Edmonds Morton Barrows Taylor
ATTORNEYS

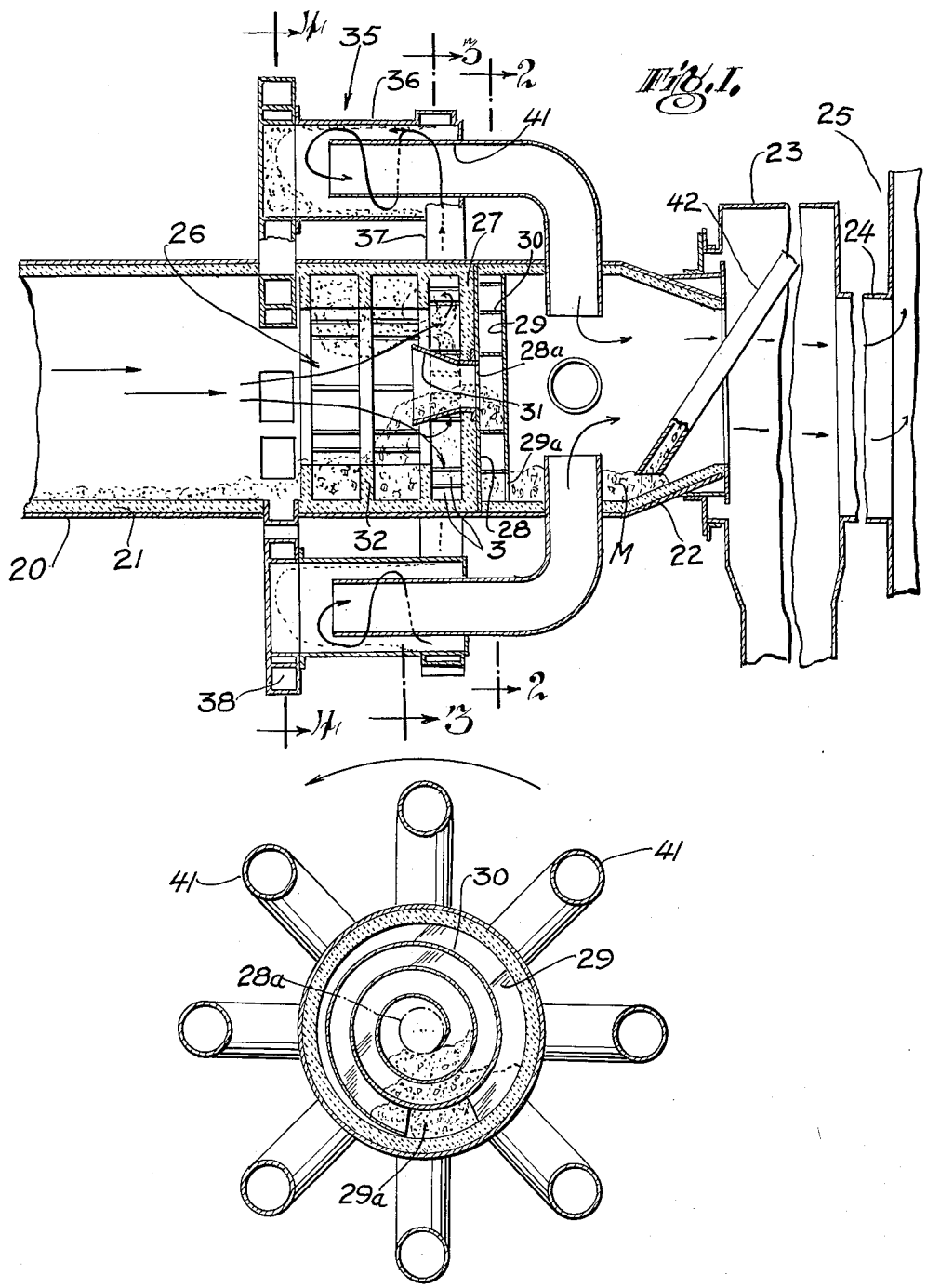

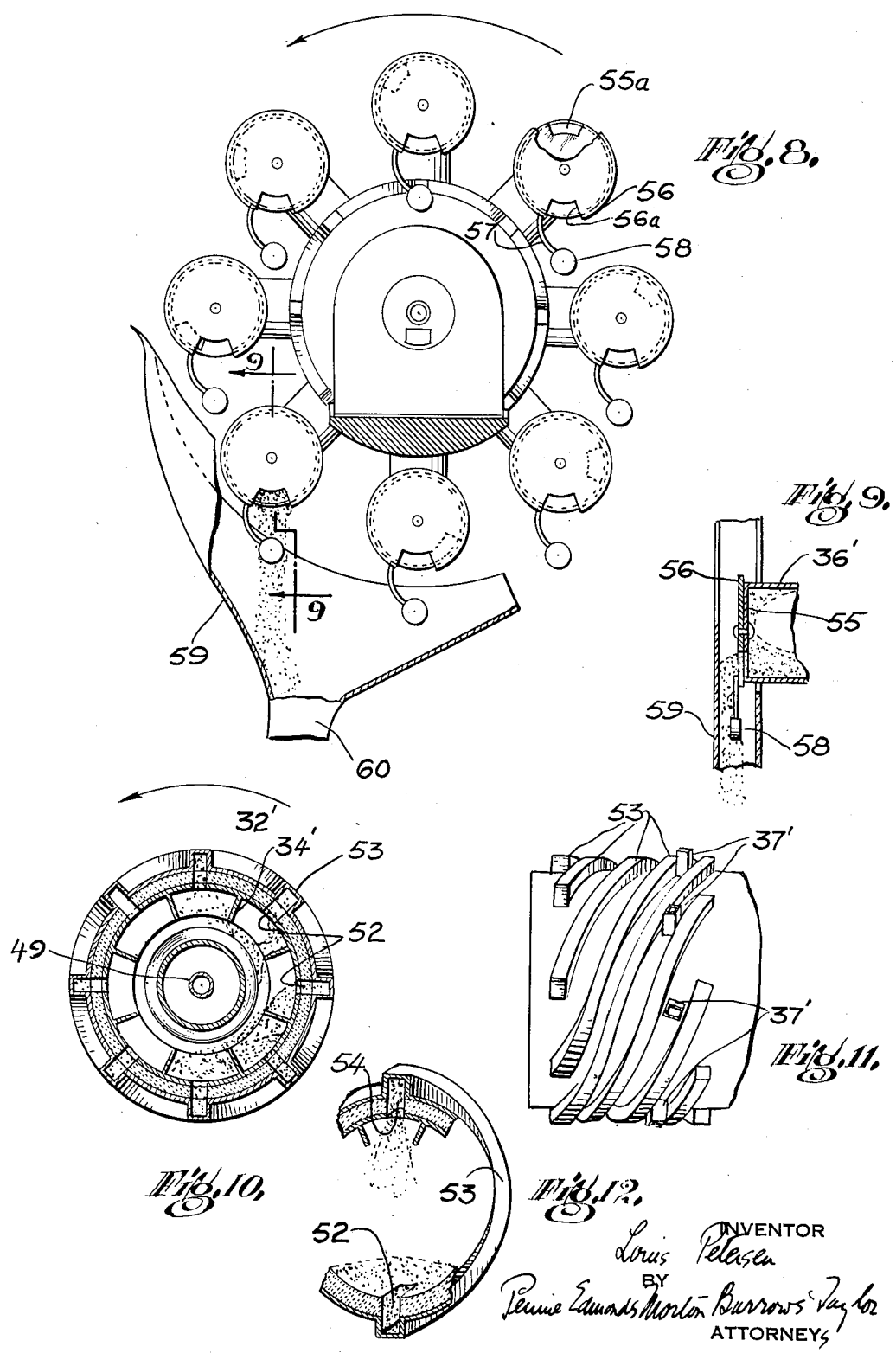

United States Patent Office 2,740,620
Patented Apr. 3, 1956

2,740,620

ROTARY KILN WITH INTEGRAL PREHEATING OR COOLING MEANS

Louis Petersen, Rye, N. Y., assignor to F. L. Smidth & Co., New York, N. Y., a corporation of New Jersey Application September 22, 1954, Serial No. 457,647

12 Claims. (Cl. 263—33)

This invention relates to the burning of finely divided materials in the production of cement, the calcination of limestone, the roasting of ores, etc. More particularly, the invention is concerned with a novel rotary kiln or drum for use in such burning operations, which is provided with means for effecting heat recovery by transfer of heat between the materials and gases present in the kiln. In the new kiln, the heat transfer may be carried on for the purpose of either preheating the materials to be burned by heat derived from the hot exhaust gases or cooling the burned material by transfer of heat therefrom to the air to be used as secondary air of combustion. In either case, the heat exchange is effected in such a way that the creation of a dust nuisance, as a result of material leaving the kiln in suspension in exhaust gases, is avoided.

The new kiln is of the usual tubular form and it rotates on an axis inclined at a low angle to the horizontal. The material to be burned is fed into the upper end of the kiln and passes down the kiln counter-current to hot gases produced by combustion of fuel supplied by a burner pipe entering the lower end of the kiln. The upper end of the kiln is connected in the ordinary way to a smoke chamber, which is in turn connected to a stack, and the usual hood is located at the lower end of the kiln. Near one end, the kiln is provided with a mixing chamber, which may be an integral section of the kiln or an extension thereof. Within the mixing chamber, the finely divided material is entrained and carried along in suspension in a gas stream flowing through the chamber. The material and stream are at different temperatures and heat exchange occurs between the material and gas during the travel of the material in suspension. The gas stream laden with material passes from the chamber into at least one separator of the cyclone type, from which the separated gases flow back into the kiln, while the separated material is either returned to the kiln or discharged, depending upon whether the heat exchange was for preheating or cooling purposes. In the new kiln, accordingly, heat recovery is effected by heat transfer taking place between a flowing gas stream and material entrained therein, and the material is separated from the stream before the stream leaves the kiln.

For a better understanding of the invention, reference may be had to the accompanying drawings, in which Fig. 1 is a fragmentary longitudinal vertical sectional view of a form of the new kiln with an integral preheater;

Figs. 2 and 3 are sectional views on the lines 2—2 and 3—3 of Fig. 1, respectively;

Fig. 6 is a fragmentary vertical longitudinal sectional view of a form of the new kiln provided with a cooler;

Fig. 7 is a sectional view on the line 7—7 of Fig. 6;

Fig. 8 is a view of the kiln shown in Fig. 6 in end elevation;

Fig. 9 is a sectional view on the line 9—9 of Fig. 8;

Fig. 10 is a sectional view on the line 10—10 of Fig. 6;

Fig. 11 is a fragmentary elevational view of the lower end of the kiln shown in Fig. 6; and Fig. 12 is a diagrammatic sectional view showing parts of the kiln of Fig. 6.

Figure 3:
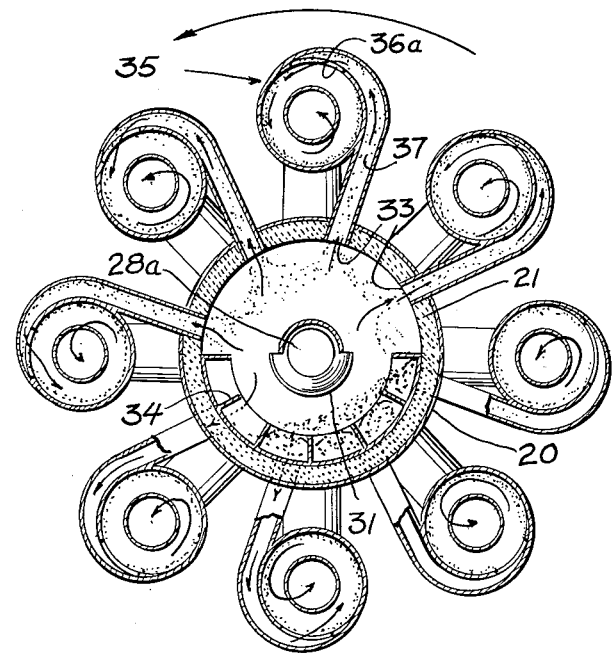
Figure 4:
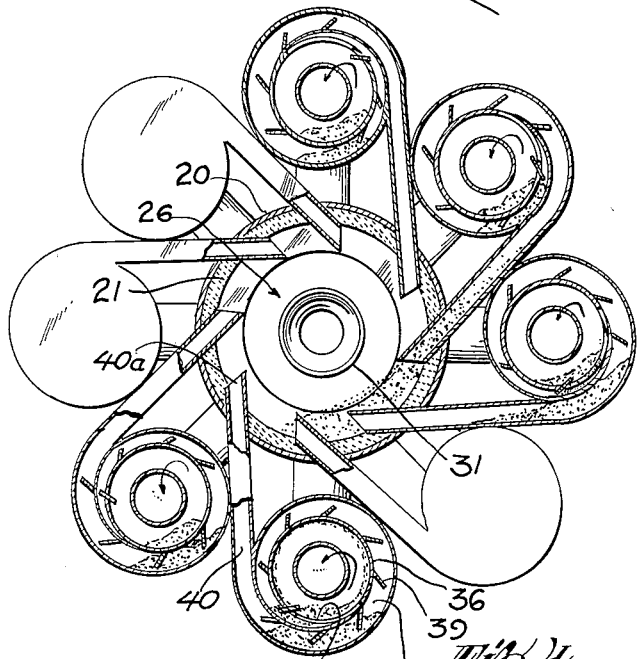
Fig. 4 is a view, partly in end elevation and partly in section on the line 4—4 of Fig. 1.

The form of the new kiln shown in Fig. 1 includes the usual kiln tube 20 having a refractory lining 21 and mounted for rotation in the usual way on an axis inclined down and to the left at a slight angle to the horizontal. At its upper end, the kiln has a section 22 of tapering diameter, which leads into a smoke chamber 23, which is in turn connected by a duct 24 to a stack 25. The pull of the stack draws secondary air of combustion into the lower end of the kiln and the exhaust gases upward through the kiln and out through the smoke chamber. In some installations, the desired low pressure in the kiln is produced by an induced draft fan installed between the smoke chamber 23 and stack 25. Near the upper end of the kiln, an integral section of the kiln is used as a mixing chamber, generally designated 26. This chamber is closed at its upper end, which is upstream with respect to the flow of material, by a wall 27 and a feeder comprising spaced plates 28 and 29 with a spiral partition 30 between them is mounted against the upper face of the wall. The plate 29 has an opening 29a adjacent its periphery, which leads into the outermost convolution of the spiral passage defined by the plates and partition 30 and the plate 28 has a central opening 28a, to which the inner end of the spiral passage leads. The opening 28a is in registry with a central opening in wall 27 and a spout of flared form has its small end mounted in the opening in wall 27 and connected to the lower side of plate 28.

The chamber 26 is provided with a plurality of internal spaced annular partitions 32, here shown as three in number, and the upper partition of the group is spaced from wall 27. The circumferential portion of the wall of the kiln between the chamber wall 27 and the adjacent partition 32 is formed with a plurality of angularly spaced outlet ports 33 and a plurality of lifter elements 34 are mounted between adjacent partitions 32. The spout 31 extends from wall 27 downwardly past the adjacent partition 32, so that material discharged from the spout will enter that part of the chamber containing the lifter elements.

A plurality of cyclone separators 35, one for each chamber outlet port 33, are mounted on the outside of the kiln adjacent the mixing chamber 26 and each separator includes a tube 36 extending axially of the kiln. Each separator has an inlet 36a facing outwardly near its upper end and a duct 37 connects each port to the inlet of its separator. Near the lower end of each separator, its tube 36 is formed with an outlet opening 36b for separated material and a spiral feeding passage 38 receives material discharged through the opening. The passage is formed with internal vanes 39, which cooperate with the material traveling through the passage to serve as a gas seal, and a duct 40 leads from the outer end of the passage and extends into the kiln through an opening in the wall thereof. The end 40a of each duct 40 within the kiln is so shaped that, upon rotation of the kiln, material traveling through duct 40 will be discharged upon the surface of the kiln lining.

Each separator 35 has a gas discharge duct 41 leading from the interior of the separator through the upper end thereof and extending through an opening into the interior of the kiln at a point upstream from the mixing chamber, with respect to the flow of material, between plate 29 and the conical section 22 of the kiln. Each duct 41 terminates a considerable distance inwardly from the lining of the kiln.

The material to be burned is supplied through a pipe 42, which is mounted to extend through the smoke chamber 23 and into the conical section 22 of the kiln. The pipe terminates close to the inner surface of the conical section, so that the material, indicated at M, may flow along the kiln during the rotation of the latter without being picked up by gases entering the kiln from the separators through pipes 41.

In the operation of the apparatus described, the material supplied through pipe 42 travels down the kiln to enter the opening 29a leading to the spiral passage defined by plates 28 and 29 and partition 30. The material issuing from the passage passes through the feed spout 31 and enters the mixing chamber, where it is alternately raised by the lifter elements and dropped. The hot exhaust gases traveling up the kiln enter the mixing chamber on their way to the exhaust ports 33 and they entrain the finely divided material and carry it in suspension into the separators 35. During the transport of the material in suspension in the gases, the material is heated, and the material separated in the separators travels through the spiral feeding passages 40 and is discharged through the ends 40a thereof into the kiln below chamber 26. The gases separated in the separators re-enter the kiln through the ducts 41 and escape through the smoke chamber 23 and the duct 24 into stack 25 to be discharged. The material preheated by entrainment with the gases and separated in separators 35 travels down the kiln for burning in the usual way and is discharged at the lower end. Particles in the feed to the mixing chamber, which are not entrained by the gases, because of the size of the particles or for other reasons, pass over the lowermost partition 32 and travel down the kiln with the material from the separators.

The modified form of kiln illustrated in Fig. 6 includes the usual tube 20' with its liner 21' and, at its lower end, it is provided with an integral section serving as a mixing chamber 26'. This chamber is closed at its upper end by the wall 43 and is provided with spaced internal annular partitions 32' downwardly from wall 43. At its lower end, the chamber is provided with a plate 44 having a central neck 44a leading into a hood 45 supported on a platform 46 and having a bottom opening 47 for admission of air. A generally conical partition 48 extends through the hood 45, the mixing chamber 26', and the wall 43 to open into the interior of the kiln and a burner pipe 49 is mounted in a plate 50 closing the small end of partition 48 and provided with an observation window 51.

The kiln shell is provided with a plurality of equiangularly spaced outlet openings 52 on the upper side of wall 43 and the openings are connected by helical feeding tubes 53 on the outside of the kiln to respective inlet ports 54 leading into the interior of the mixing chamber 26' between the two lower partitions 32'. A plurality of lifter elements 34' are mounted in the chamber 26' between the two lower partitions 32', while, in the space between wall 43 and the adjacent partition 32', the wall of chamber 26' is provided with outlet ports 33'.

A plurality of cyclone separators 35', one for each outlet port 33', are mounted on the outside of the kiln extension forming the mixing chamber 26'. Each separator includes a tube 36' with an inlet opening 36'a and the opening is connected to the associated chamber outlet port 33' by a duct 37'.

At its lower end, the tube 36' of each separator 35' is closed by a disc 55 having an opening 55a near its periphery, and a closure plate 56 is pivoted on each plate 55 concentrically therewith and has a cut-out 56a in its periphery. An arm 57 carrying a weight 58 is attached to each plate 56 in such position that, as the kiln rotates (Fig. 8), the relative movement of the disc and plate of each separator causes the openings 55a and 56a to come into registry to permit discharge of material as the separator is approaching bottom dead center, at which time the accumulated material in the separator will fill the openings and prevent atmospheric air from entering the separator. The material issuing through the registering openings is discharged into a hopper 59, from which a discharge duct 60 leads.

Each separator 36' has a gas discharge duct 41' leading from the interior of the separator through the upper end thereof and extending through an opening into the interior of the kiln at a point upstream from the mixing chamber, with respect to the flow of material, between the wall 43 and the hot zone in the kiln created by the flame issuing from the burner pipe.

In the operation of the kiln illustrated in Fig. 6, the burned material traveling down the kiln enters the ports 52 and is advanced through the spiral feeder pipes 53 and discharged into the mixing chamber 26'. Air for combustion is drawn into hood 45 through opening 47 by the reduced pressure in the kiln and the air enters the mixing chamber through the opening in its lower end around the conical partition 48. In the chamber, the material lifted by the lifter elements and dropped into the air stream is entrained thereby and the air with the hot material in suspension travels through the mixing chamber and issues through the exhaust ports to enter the separators. During the travel of the material in suspension in the air, it gives up heat to the air and, in the separators, the material is separated, while the heated air passes through the pipes 41' and enters the kiln for use as secondary air of combustion. The material separated in the separators collects in the lower ends thereof against plates 55 and, as each separator is moved down by the kiln to its lowermost position, the closure plate 56 opens the separator and the cooled material is discharged into hopper 59 and conducted away through duct 60.

Figure 5:
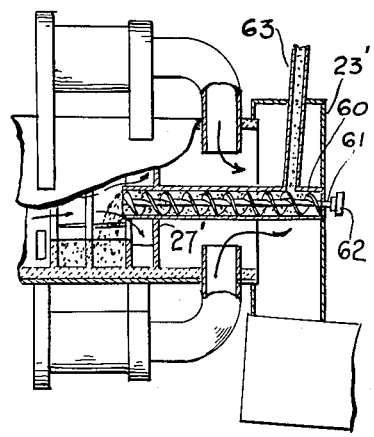
Fig. 5 is a fragmentary sectional view similar to Fig. 1 but showing a modified construction.

In the form of the new kiln illustrated in Figs. 1–4, incl., the raw material fed into the kiln through the pipe 42 is carried into the mixing chamber through the spiral feeder formed by plates 28, 29 and the spiral partition 30. The material within the feeder then serves as a seal, which prevents the escape of gases traveling through the feeder counter-current to the material. If desired, the spiral feeder may be replaced by the feeder illustrated in Fig. 5. This feeder comprises a screw conveyor of the usual type comprising a casing 60 enclosing a shaft 61 with screw flights. The conveyor is supported at one end on the wall of the smoke chamber 23' and its other end projects through the upper wall 27' of the mixing chamber. The shaft 61 carries a pulley 62, by which the shaft can be rotated and material is delivered into the conveyor casing through a pipe 63. In the operation of the conveyor, the material fills the space between the flights, so that escape of the gases through the conveyor is prevented.

In both forms of the kiln, heat exchange is effected between material and flowing gases and the efficiency of the operation is thereby increased. At the same time, the provision of the separators for separating the entrained materials from the gases at the end of the heat transfer operation prevents the creation of a dust nuisance.

The forms of the new kiln illustrated include a mixing chamber and a set of separators employed for either preheating or cooling purposes. It is to be understood that, if desired, the kiln may include both a preheater and a cooler of the constructions described.

I claim:

1. A kiln comprising a rotary tube, a mixing chamber rotating with the tube and provided with at least one outlet port, means for introducing material into the mixing chamber, a cyclone separator mounted on the outside of the tube and rotating therewith, said separator having an inlet and separate outlets for material and gas, a duct connecting the mixing chamber outlet port and the separator inlet, a connection from the separator gas outlet into the interior of the tube at a point upstream from the mixing chamber, with respect to the flow of material, and means for causing a flow of gas through the mixing chamber and separator in succession and through the connection into the tube.

2. A kiln as defined in claim 1, in which a section of the tube serves as a mixing chamber and the upstream end of the section, with respect to the flow of material, is closed to the passage of gas.

3. A kiln as defined in claim 1, in which the means for introducing material into the chamber is constructed to prevent escape of gas counter-current to the flow of material.

4. A kiln as defined in claim 1, in which the mixing chamber is provided with internal lifting elements for lifting material and dropping it, as the tube rotates.

5. A kiln as defined in claim 1, in which the means for introducing material into the mixing chamber includes a spiral passage, which is closed by the material flowing through it against flow of gas counter-current to the flow of material.

6. A kiln as defined in claim 5, in which the spiral passage has a central discharge tube extending axially of the tube and into the mixing chamber.

7. A kiln as defined in claim 5, in which the spiral passage is formed within a screw conveyer.

8. A kiln as defined in claim 1, in which the mixing chamber is a section of the tube adjacent its upstream end with respect to the flow of material, and the separator material outlet is connected to the interior of the tube below the chamber by a duct.

9. A kiln as defined in claim 1, in which the mixing chamber is a section of the tube at its downstream end, with respect to the flow of material, and has a central inlet for air at its downstream end, the separator has a closure for its material outlet, and means are provided for opening the closure as the separator approaches its lowermost position and holding the closure closed during the remainder of the movement of the separator with the tube.

10. A kiln as defined in claim 1, in which the mixing chamber is a section of the tube at its downstream end, with respect to the flow of material, and has a closed upstream end with a central opening, a burner pipe extends through the chamber and opening to terminate within the tube, and a connection leads from the gas outlet of the separator into the interior of the tube downstream from the hot zone produced by the flame from the burner pipe.

11. A kiln comprising a rotary tube, a mixing chamber rotating with the tube and being provided with at least one outlet port, a material-receiving section rotating with the tube and located at a point upstream from the mixing chamber, with respect to the flow of material, a partition extending transversely of the tube between the mixing chamber and the material-receiving section for intercepting axial flow of gas from the mixing chamber to the material-receiving section, means for introducing gas into the mixing chamber, a cyclone separator mounted on the outside of the tube and rotating therewith, said separator having an inlet and separate outlets for material and gas, a duct connecting the mixing chamber outlet port and the separator inlet, and means for introducing material from the material-receiving section into the mixing chamber constructed so that, during the operation of the kiln, material flowing therethrough prevents escape of gas countercurrent to the flow of the material.

12. A kiln as defined in claim 11, in which there is provided a connection from the separator gas outlet to the material-receiving section, and means for causing a flow of gas through the mixing chamber and separator in succession and through the connection into the material-receiving section.

References Cited in the file of this patent

UNITED STATES PATENTS

| | | |
|---|---|---|
| 2,218,476 | Newhouse | Oct. 15, 1940 |
| 2,259,702 | Lindhard | Oct. 21, 1941 |